US012806665B2

(12) United States Patent
Ramon Mesa

(10) Patent No.: US 12,806,665 B2
(45) Date of Patent: *Nov. 24, 2026

(54) PLANETARY REGOLITH DUST EXPULSION FROM SPACE SUITS USING PIEZOELECTRIC ASSEMBLY INDUCED VIBRATION

(71) Applicant: Hamilton Sundstrand Corporation, Charlotte, NC (US)

(72) Inventor: Jorge Ramon Mesa, League City, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 323 days.

This patent is subject to a terminal disclaimer.

(21) Appl. No.: 18/408,261

(22) Filed: Jan. 9, 2024

(65) Prior Publication Data

US 2025/0222495 A1 Jul. 10, 2025

(51) Int. Cl.
*B08B 7/02* (2006.01)
*B64G 6/00* (2006.01)

(52) U.S. Cl.
CPC . *B08B 7/02* (2013.01); *B64G 6/00* (2013.01)

(58) Field of Classification Search
None
See application file for complete search history.

(56) References Cited

U.S. PATENT DOCUMENTS

2003/0206642 A1* 11/2003 Menzies ................ H04R 5/023 381/301
2008/0060101 A1 3/2008 Cadogan
2018/0342976 A1* 11/2018 Pederson .............. H10F 77/955
2020/0326537 A1* 10/2020 Busey .................... A42B 3/042
2023/0099288 A1 3/2023 Wang et al.
2023/0241627 A1 8/2023 Manyapu et al.
2025/0234787 A1* 7/2025 Ramon Mesa ........ H10N 39/00

FOREIGN PATENT DOCUMENTS

CN 112570387 A 3/2021
CN 116851360 A 10/2023
EP 3786075 A1 3/2021

OTHER PUBLICATIONS

Search Report issued in European Patent Application No. 25150996.4; Date of Mailing May 19, 2025 (9 pages).

* cited by examiner

*Primary Examiner* — Kaj K Olsen
*Assistant Examiner* — Arlyn I Rivera-Cordero
(74) *Attorney, Agent, or Firm* — CANTOR COLBURN LLP

(57) ABSTRACT

A system is provided including one or more piezoelectric assemblies, wherein the one or more piezoelectric assemblies include a plurality of piezoelectric transducers. The system includes amplifier circuitry coupled to the plurality of piezoelectric transducers and configured to provide an alternating-current (AC) voltage signal to one or more piezoelectric transducers of the plurality of piezoelectric transducers, based on a target configuration associated with removing regolith dust. The one or more piezoelectric transducers are configured to vibrate based on a magnitude and a frequency of the AC voltage signal.

20 Claims, 4 Drawing Sheets

PLANETARY REGOLITH DUST EXPULSION FROM SPACE SUITS USING PIEZOELECTRIC ASSEMBLY INDUCED VIBRATION

BACKGROUND

The present disclosure relates to dust mitigation, and more, particularly to a dust mitigation system utilizing a piezoelectric assembly.

Regolith dust accumulating and collecting in space suits is a documented issue. Some techniques for regolith dust mitigation may be incapable of effectively removing or preventing the accumulation of such dust and/or time consuming. In some cases, dust mitigation techniques may be associated with high overhead costs and/or impractical for some cases due to available space.

BRIEF DESCRIPTION

According to an aspect of the disclosure a system is provided including: one or more piezoelectric assemblies, wherein the one or more piezoelectric assemblies include a plurality of piezoelectric transducers; and amplifier circuitry coupled to the plurality of piezoelectric transducers and configured to provide an alternating-current (AC) voltage signal to one or more piezoelectric transducers of the plurality of piezoelectric transducers, based on a target configuration associated with removing regolith dust, wherein the one or more piezoelectric transducers are configured to vibrate based on a magnitude and a frequency of the AC voltage signal.

In some embodiments, the one or more piezoelectric assemblies are removably coupled to an exterior surface of a protective suit.

In any one or combination of the embodiments disclosed herein, the one or more piezoelectric assemblies are included in a fabric of a protective suit, and the target configuration is associated with removing the regolith dust from a surface of the protective suit.

In any one or combination of the embodiments disclosed herein, the one or more piezoelectric assemblies are included in a garment wearable over a protective suit, and the target configuration is associated with removing the regolith dust from a surface of the garment.

In any one or combination of the embodiments disclosed herein, the system may further include: a personal life support system removably electrically couplable to a protective suit, wherein the amplifier circuitry is included in a housing of the personal life support system, wherein the protective suit includes a space suit operable in a space environment.

In any one or combination of the embodiments disclosed herein, the system may further include: a vehicle, a space station, or habitat operable in a space environment, wherein the amplifier circuitry is included in at least one of the vehicle, the space station, or the habitat.

In any one or combination of the embodiments disclosed herein, wherein the amplifier circuitry is configured to refrain from providing the AC voltage signal to one or more second piezoelectric transducers of the plurality of piezoelectric transducers, based on the target configuration.

In any one or combination of the embodiments disclosed herein, the amplifier circuitry is configured to provide a second AC voltage signal to one or more second piezoelectric transducers of the plurality of piezoelectric transducers, based on the target configuration, wherein the one or more second piezoelectric transducers are configured to vibrate based on a second magnitude and a second frequency of the AC voltage signal; and providing the AC voltage signal and the second AC voltage signal is based on the target configuration associated with removing the regolith dust, wherein the target configuration includes an order associated with activating the one or more piezoelectric transducers and the one or more second piezoelectric transducers.

In any one or combination of the embodiments disclosed herein, providing the AC voltage signal is based on target criteria associated with removing the regolith dust, wherein the target criteria includes at least one of: a removal level of the regolith dust; a target duration associated with removing the regolith dust; and a target power consumption.

In any one or combination of the embodiments disclosed herein, providing the AC voltage signal is based on one or more characteristics associated with the regolith dust, wherein the one or more characteristics include at least one of: particle size; particle type; and charge level.

In any one or combination of the embodiments disclosed herein, providing the AC voltage signal is based on removing the regolith dust from one or more target locations associated with a protective suit, wherein the one or more target locations are associated with at least one of: a torso area of the protective suit; an arm sleeve of the protective suit; a leg sleeve of the protective suit; a boot associated with the protective suit; and a helmet associated with the protective suit.

In any one or combination of the embodiments disclosed herein, providing the AC voltage signal is based on a target sterilization level associated with sterilizing at least a portion of the regolith dust; and the vibration of the one or more piezoelectric transducers sterilizes at least the portion of the regolith dust.

In any one or combination of the embodiments disclosed herein, at least one piezoelectric assembly of the one or more piezoelectric assemblies is of: a cuff shape; a sleeve shape; a mesh structure; and a plate assembly.

In any one or combination of the embodiments disclosed herein, the one or more piezoelectric assemblies are formed of at least one of: a fabric material; and a flexible material.

According to an aspect of the disclosure a space suit is provided including: one or more piezoelectric assemblies removably coupled to a surface of the space suit, wherein the one or more piezoelectric assemblies include a plurality of piezoelectric transducers; and a personal life support system, wherein: one or more piezoelectric transducers of the plurality of piezoelectric transducers are configured to vibrate based on a magnitude and a frequency of an AC voltage signal provided by amplifier circuitry, wherein the amplifier circuitry is coupled to the plurality of piezoelectric transducers and is included in the personal life support system or external to the space suit; and the magnitude and the frequency of the AC voltage signal are based on a target configuration associated with removing regolith dust.

In any one or combination of the embodiments disclosed herein, the one or more piezoelectric assemblies are included in a fabric of a protective suit, and the target configuration is associated with removing the regolith dust from the surface of the protective suit; or the one or more piezoelectric assemblies are included in a garment wearable over the protective suit, and the target configuration is associated with removing the regolith dust from a surface of the garment.

According to an aspect of the disclosure a method is provided including: determining a target configuration associated with removing regolith dust; determining, based on the target configuration, a magnitude and a frequency of an alternating-current (AC) voltage signal to be applied to one or more piezoelectric transducers of a plurality of piezoelectric transducers, wherein the plurality of piezoelectric transducers are included in one or more piezoelectric assemblies removably coupled to a surface of a space suit; and providing, by amplifier circuitry, the AC voltage signal to the one or more piezoelectric transducers, based on the target configuration, wherein the one or more piezoelectric transducers vibrate based on the magnitude and the frequency of the AC voltage signal.

In any one or combination of the embodiments disclosed herein, providing the AC voltage signal is based on target criteria associated with removing the regolith dust, wherein the target criteria includes at least one of: a removal level of the regolith dust; a target duration associated with removing the regolith dust; and a target power consumption.

In any one or combination of the embodiments disclosed herein, providing the AC voltage signal is based on one or more characteristics associated with the regolith dust, wherein the one or more characteristics include at least one of: particle size; particle type; and charge level.

In any one or combination of the embodiments disclosed herein, providing the AC voltage signal is based on removing the regolith dust from one or more target locations associated with a protective suit; providing the AC voltage signal is based on a target sterilization level associated with sterilizing at least a portion of the regolith dust; and the vibration of the one or more piezoelectric transducers sterilizes at least the portion of the regolith dust.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method are presented herein by way of exemplification and not limitation with reference to the Figures.

Regolith is a blanket of unconsolidated, loose, heterogeneous superficial deposits covering solid rock. Regolith may include dust, broken rocks, and other related materials and is present on Earth, the Moon, Mars, some asteroids, and other terrestrial planets and moons.

Lunar regolith includes rock fragments and, predominantly, much smaller particles that are generally referred to as lunar soil. Lunar soil may include small particles (also referred to herein as "lunar dust," "regolith dust," or "dust") which may accumulate on, adhere to, or otherwise contaminate the surface of equipment (e.g., a protection suit, a space suit, a lunar terrain vehicle, solar panels, a planetary base/outpost &/or processing plants, a space station, satellites, spacecraft or the like) associated with planetary exploration and/or digging operations.

Lunar regolith may range in size from large boulders to ultrafine dust, with some particles measuring less than 1 cm in size. Lunar soil may refer to grains less than 1 cm in size, while the finest regolith components, those particles with a diameter under 20 μm, may be referred to as lunar dust. For the purposes of the present disclosure, the terms "lunar dust," "lunar soil," "regolith dust," and "dust" may be utilized interchangeably.

Regolith dust may be challenging to safely and effectively remove in the space environment (e.g., microgravity environment) due to the small size of the particles. In some cases, regolith dust may include relatively tiny charged particles (e.g., made from crushed rock) having a sharpness and abrasiveness that is potentially dangerous to the fabric and lifespan of a space suit.

Some techniques utilize brushes in a 'car wash' type of assembly for cleaning space suits in which the brushes are applied to remove dust from the space suits. In some cases, such approaches may provide a relatively simple and low cost option, but are time consuming for crew conducting or undergoing the cleaning and are at most partially effective. Some other more complex techniques may utilize water, energy, volume, and mass but may be cost prohibitive.

According to one or more embodiments of the present disclosure, a piezoelectric assembly is described which may include a lightweight, low power, and relatively small (e.g., small volume) assembly that includes a plurality of piezoelectric transducers. Example aspects of the piezoelectric assembly and a dust expulsion system (also referred to herein as a dust mitigation system) including the piezoelectric assembly are described with reference to the following figures.

Figure 1:
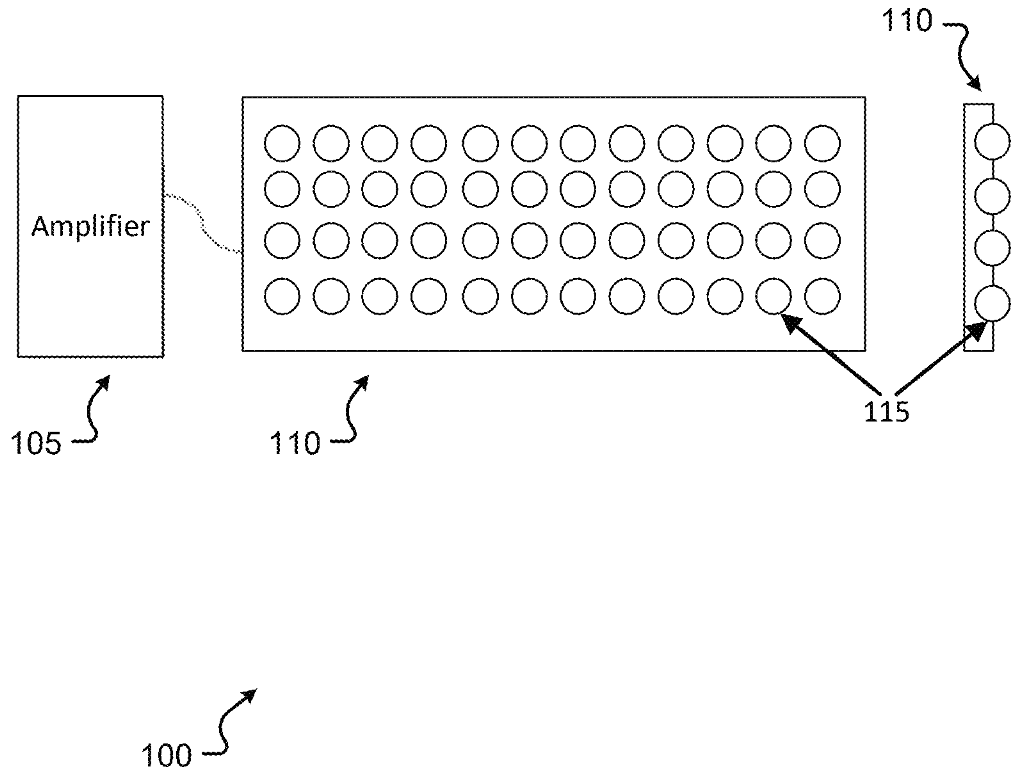
FIG. 1 illustrates an example of a dust mitigation system in accordance with one or more embodiments of the present disclosure.

FIG. 1 illustrates an example of a dust mitigation system 100 in accordance with one or more embodiments of the present disclosure.

According to one or more embodiments of the present disclosure, the dust mitigation system 100 may include an amplifier 105 and a piezoelectric assembly 110. In some embodiments, the amplifier 105 is a signal generator amplifier capable of generating a signal (e.g., an alternating-current (AC) voltage signal) and providing the signal to piezoelectric transducers 115 included in the piezoelectric assembly 110. In some examples, the signal may be a high current, high voltage (i.e., high voltage magnitude), and high frequency signal, for example, a high frequency sine wave. According to one or more embodiments of the present disclosure, the piezoelectric assembly 110 and piezoelectric transducers 115 may include piezo-based assemblies rated for surviving the effects of thermal, radiation, vacuum, micro-g, and other conditions associated with space exploration, In some aspects, the amplifier 105 may provide the signal to the piezoelectric assembly 110 (and included piezoelectric transducers 115) and/or other piezoelectric assemblies 110 (and included piezoelectric transducers 115) (not illustrated)

included in the dust mitigation system 100. In some embodiments, the dust mitigation system 100 may include multiple amplifiers 105, and each amplifier 105 is capable of generating and providing a signal according to target signal parameters (e.g., current level, voltage level, frequency, signal type, and the like) to one or more piezoelectric assemblies 110.

In some examples, the frequency of the signal provided by the amplifier 105 may be in an ultrasonic frequency range. For example, the frequency of the signal may be in a range supportive of solid sterilization applications such as, for example, the sterilization of dust, regolith, dirt, or the like or the sterilization of solids remaining from the water extraction of wastewater (e.g., from urine, brine, feces, vomit, menses, trash, and the like). In some examples, the frequency of the signal may be in a range of (about 10 kHZ to about 500 kHz). However, aspects of the present disclosure are not limited thereto, and the amplifier 105 may be capable of providing signals of any current, voltage, and/or frequency suitable for driving the piezoelectric transducers 115 in accordance with the dust mitigation techniques supported by the present disclosure. For example, aspects of the present disclosure support configuring the current, voltage, and/or frequency based on particle size, material content, and density of a solid to be sterilized. The solid may include dust, regolith, dirt. The solid may include a solid remaining from wastewater following the extraction of water from the wastewater. In some embodiments, the amplifier 105 may be a standalone device. In some other embodiments, the amplifier 105 may be integrated in a signal generator, a computing device (e.g., a computing device 308 later described herein), or other electronic circuitry associated with the dust mitigation system 100.

Example aspects of the piezoelectric assembly 110 are described herein. The piezoelectric assembly 110 may be formed of a material such that the piezoelectric assembly 110 is relatively lightweight. In some aspects as will be described herein, the piezoelectric assembly 110 may be lightweight, consume a relatively low amount of power, and relatively small (e.g., small volume) such that the piezoelectric assembly 110 may be integrated with a space suit or other structure.

The piezoelectric assembly 110 may include piezoelectric transducers 115 (also referred to herein as piezoelectric sensors or piezos). In some embodiments, the piezoelectric transducers 115 are disposed in an array configuration. However, aspects of the present disclosure are not limited thereto, and the piezoelectric transducers 115 may be disposed or arranged according to any suitable pattern supportive of the techniques described herein.

In some examples, the piezoelectric transducers 115 are disposed in the piezoelectric assembly 110 and arranged such that the piezoelectric transducers 115 are spaced apart from each other by a distance in any suitable direction (e.g., X direction and/or Y direction with respect to an XY plane of the piezoelectric assembly 110). In some examples, the diameter of each piezoelectric transducer 115 may be about 0.25 inches. In some embodiments, the center to center (C-C) distance from a piezoelectric transducer 115 to another piezoelectric transducer 115 may be about 0.375 inches, and the edge to edge (e-e) distance from a piezoelectric transducer 115 to another piezoelectric transducer 115 may be about 0.125 inches. However, aspects of the present disclosure are not limited thereto, and the systems and techniques described herein support maintaining or adjusting the diameters of the piezoelectric transducers 115 and/or distances between piezoelectric transducers 115 based on a target application (e.g., dust removal, dust break up, solids sterilization, water recovery and extraction, water sterilization, drying, or the like) of the piezoelectric assembly 110, available surface area of the piezoelectric assembly 110, and the like.

The piezoelectric transducers 115 are configured to contract or expand based on a voltage signal applied (e.g., by the amplifier 105) to the piezoelectric transducers 115. In some aspects, through the contraction and expansion of the piezoelectric transducers 115, the piezoelectric assembly 110 may support features for sieving or removing dust from the surface of a space suit (e.g., space suit 301 later described herein), a garment couplable to the space suit or wearable over the space suit, or other component (e.g., a lunar terrain vehicle, a planetary base/outpost, a space station, or the like) with which the piezoelectric assembly 110 is integrated.

For example, the piezoelectric assembly 110 and included piezoelectric transducers 115 support a piezo interface configured to provide a forced vibration that may remove planetary dust from a space suit (e.g., space suit 301 later described herein), a garment couplable to the space suit or wearable over the space suit, or other component (e.g., a lunar terrain vehicle, a planetary base/outpost, a space station, or the like) as supported by aspects of the present disclosure.

The piezoelectric transducers 115 are capable of converting one form of energy into another. For example, with respect to piezoelectricity, the piezoelectric transducers 115 are capable of converting mechanical pressure or stress into electrical signals and reciprocally translating electrical signals into mechanical displacement.

In some embodiments, the piezoelectric transducers 115 may be of a size (e.g., a diameter of about 0.25 inches) supportive of the techniques described herein. For example, the piezoelectric transducers 115 may be of a size supportive of efficient mobility of a space suit 301 and effective vibration for dust mitigation and removal. However, aspects of the present disclosure are not limited thereto, and the piezoelectric transducers 115 may be of any size supportive of the techniques described herein. With respect to piezoelectric assemblies 110 for a space suit (e.g., space suit 301 later described herein), an example piezoelectric assembly 110 implemented as (or integrated with) an arm sleeve of the space suit may be 14 inches in diameter and 27 inches in length, and an example piezoelectric assembly 110 implemented as (or integrated with) a leg sleeve of the space suit may be 24 inches in diameter and 36 inches in length for example. However, aspects of the present disclosure are not limited thereto, and the piezoelectric assembly 110 may be of any dimensions suitable for a space suit of a user. In some embodiments, to account for different anthropometrics dimensions of the population, aspects of the present disclosure support multiple standard sizes of piezoelectric assemblies 110 (and associated sleeves of a space suit) such as, for example, relatively small, medium, and large sizes.

In some embodiments, the piezoelectric assembly 110 may be a membrane. In some aspects, the membrane may be relatively thin to support effective integration with a structure (e.g., a sleeve of a space suit 301, a helmet of a space suit 301, or the like). In some embodiments, the piezoelectric assembly 110 may be a mesh structure. In some embodiments, the piezoelectric assembly 110 may be a plate assembly. In some aspects, the plate assembly may be perforated or indented so as to accommodate the piezoelectric transducers 115. In some embodiments, the piezoelectric assembly 110 may be formed of a fabric material and/or a non-fabric flexible material. In some embodiments in which the piezoelectric assembly 110 is a plate assembly, a thickness range of the piezoelectric assembly 110 may be about 1/16 of an inch to about 1/8 of an inch. In some embodiments in which the piezoelectric assembly 110 is a mesh structure, a thickness range of the piezoelectric assembly 110 may be about 1/32 of an inch to about 1/64 of an inch.

According to one or more embodiments of the present disclosure, the piezoelectric transducers 115 (and/or piezoelectric assembly 110) may be interwoven in a garment (e.g., a garment wearable over a space suit 301 later described herein, a space suit 301) or fabric of the garment. In some embodiments, the piezoelectric assembly 110 may be implemented as an external add-in and be permanently coupled or detachably coupled to one or more surfaces of a garment or one or more surfaces of another component (e.g., a lunar terrain vehicle, a planetary base/outpost, a space station, or the like) via, for example, stitching, an adhesive, Velcro, or the like.

For example, in the case of a protective suit (e.g., space suit 301), the piezoelectric assembly 110 may be implemented as a patch or series of patches removably couplable to one or more surfaces of the protective suit. In some embodiments, the piezoelectric assembly 110 (or multiple piezoelectric assemblies 110) may be integrated with a single fabric cover or garment wearable over the protective suit (e.g., space suit 301), in which the fabric cover or garment is manufactured as a single piece or formed of multiple sections removably coupled together. In some embodiments, the piezoelectric assembly 110 may be implemented as an external add-in which can be removably inserted into a pocket of a garment wearable over the protective suit. In some embodiments, the piezoelectric assembly 110 may be implemented as an external add-in which can be removably inserted into a pocket of the protective suit (e.g., space suit 301).

In some other embodiments, the piezoelectric assembly 110 may be implemented as an external add-in which can be removably inserted into a pocket or compartment of another component (e.g., a lunar terrain vehicle, a planetary base/outpost, a space station, or the like). The piezoelectric assembly 110 may be removably coupled to an exterior surface of a component (e.g., a space suit 301, a garment wearable over or removably couplable to the space suit 301, a lunar terrain vehicle, and the like) for which dust is to be removed. According to one or more embodiments of the present disclosure, the piezoelectric assembly 110 may be of different shapes and forms, examples of which is later described herein.

Aspects of the present disclosure support modular implementations of the piezoelectric assembly 110. For example, in the case of the fabric cover, aspects of the present disclosure support modular replacement a piezoelectric assembly 110 (e.g., among multiple piezoelectric assemblies 110) for cases in which piezoelectric transducers 115 of the piezoelectric assembly 110 break, malfunction, are saturated with lunar dust, are relatively near a specified life expectancy, or the like.

Accordingly, for example, for cases in which a space suit, space station, vehicle, or the like fitted with a dust mitigation system (and piezoelectric assemblies 110) described herein is used or operated at a location near a mining rig, the systems and techniques described herein support the ability to more frequently replace one or more piezoelectric assemblies 110 as desired. Further, for example, for cases in which a space suit, space station, vehicle, or the like fitted with the dust mitigation system is used or operated relatively far from a mining rig (e.g., lower probability of dust exposure), the systems and techniques described herein support the ability to less frequently replace one or more piezoelectric assemblies 110 as desired, providing costs savings and reduced overhead.

Figure 2:
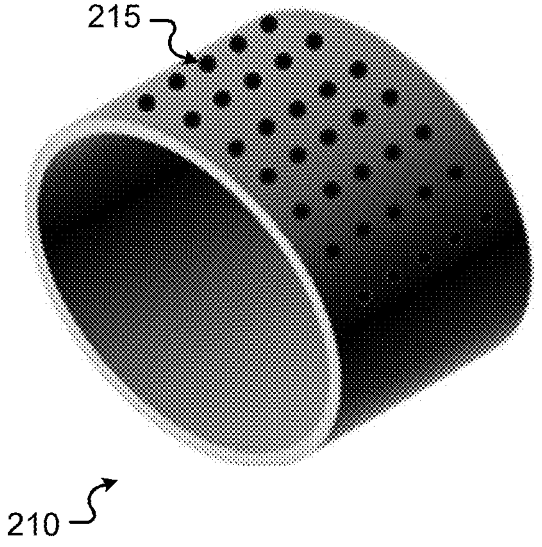
FIG. 2 illustrates an example of a piezoelectric assembly in accordance with one or more embodiments of the present disclosure.

FIG. 2 illustrates an example of a piezoelectric assembly 210 in accordance with one or more embodiments of the present disclosure. The piezoelectric assembly 210 includes aspects of piezoelectric assembly 110 described herein, and repeated descriptions of like elements are omitted for brevity In the example of FIG. 2, the piezoelectric assembly 210 is of a cuff or sleeve configuration. In some embodiments, the piezoelectric assembly 210 may support applications for cylindrical (and partially cylindrical) shaped end-products such as, for example, boots, arm sleeves of a space suit (e.g., space suit 301), leg sleeves of the space suit, and the like.

Figure 3:
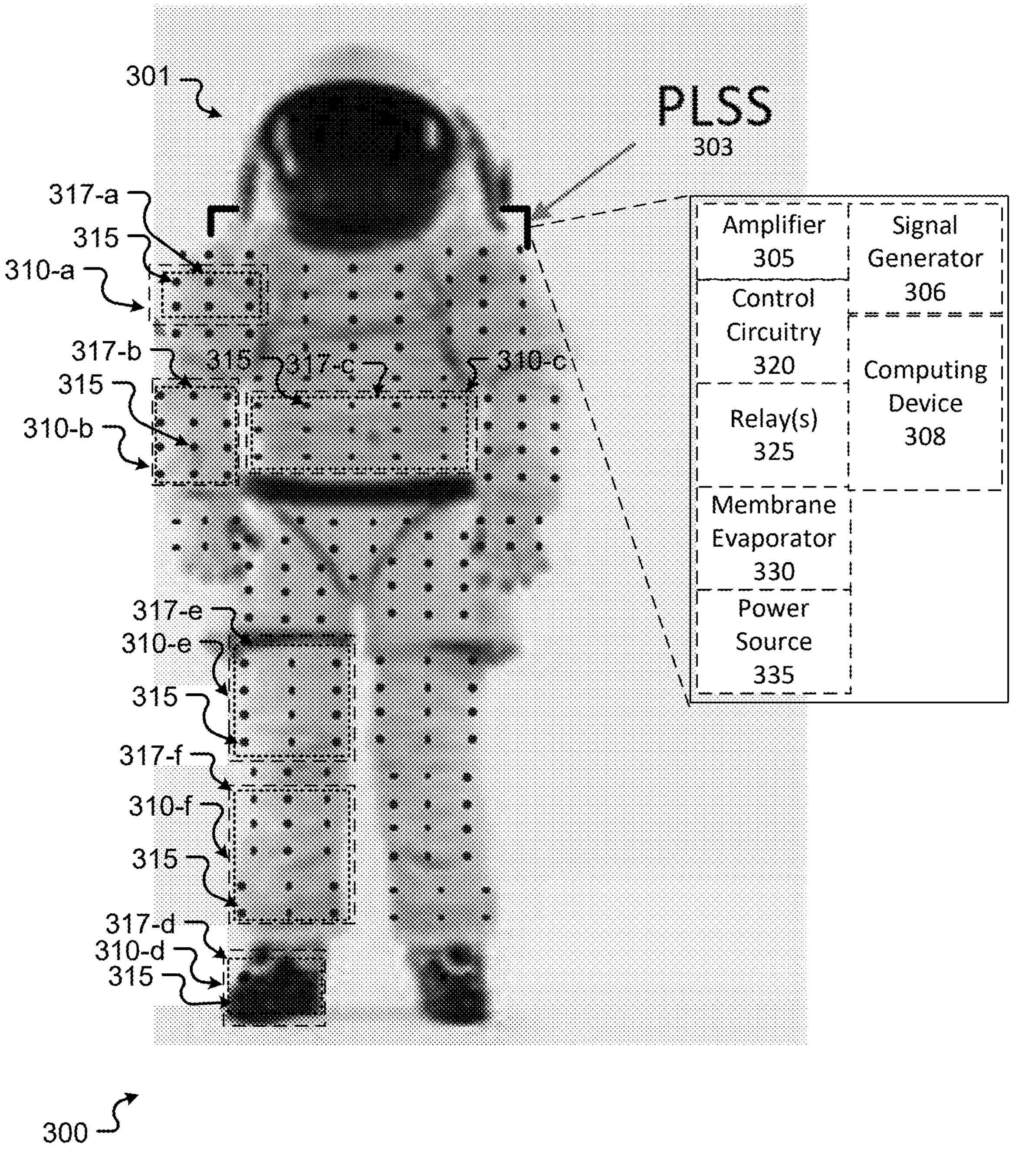
FIG. 3 illustrates an example of a dust mitigation system in accordance with one or more embodiments of the present disclosure.

FIG. 3 illustrates an example of a dust mitigation system 300 in accordance with one or more embodiments of the present disclosure.

The dust mitigation system 300 includes aspects of dust mitigation system 100 described herein, and repeated descriptions of like elements are omitted for brevity.

The dust mitigation system 300 includes a space suit 301. The space suit 301 is a protective suit worn to keep a human alive in the harsh environment of outer space, vacuum, and temperature extremes. Non-limiting examples of the space suit 301 include a space suit supportive of extravehicular activity (EVA) work performed outside of a spacecraft or space station, intra/extravehicular activity (IEVA) work inside and outside the spacecraft or space station, and the like. However, aspects of the present disclosure are not limited thereto, and aspects of the dust mitigation system 300 and the space suit 301 described herein may be implemented for other protective suits (e.g., hazardous materials suit, or the like) or structures suitable for protecting a user or environment from harmful elements (e.g., dust, chemicals, and the like) and/or for removal of the harmful elements. It is to be understood that the systems and techniques described herein are not to be limited to a space suit 301.

For example, in some alternative and/or additional embodiments, the dust mitigation and expulsion techniques described herein may be implemented for a habitat (e.g., an inflatable lunar base or outpost, a solid material-based dome structure outpost, and the like) and/or equipment (e.g., a solar panel, a satellite, and the like) associated with planetary exploration, digging operations, and other terrestrial applications. For example, the dust mitigation system 300 may include the habitat (not illustrated) and the equipment (not illustrated). Each of the habitat and the equipment may include one or more respective piezoelectric assemblies 310 and included piezoelectric transducers 315 and piezo arrays 317. In some embodiments, (not illustrated), each of the habitat and equipment may include an amplifier 305, signal generator 306, computing device 308, control circuitry 320, relay devices 325, power source 335, and sensor devices 340 supportive of aspects of the present disclosure.

In some embodiments, the dust mitigation system 300 may support implementations in which the amplifier 305 of the space suit 301 drives the piezoelectric transducers 315 (e.g., provides an amplified AC signal to the piezoelectric transducers 315) of the space suit 301. In some additional and/or alternative embodiments, the dust mitigation system 300 supports implementations in which the piezoelectric transducers 315 of the space suit 301 may be electrically coupled to and driven by an amplifier 305 of the habitat and/or an amplifier 305 of the equipment. Similarly, for example, the dust mitigation system 300 supports implementations in which the piezoelectric transducers 315 of a given component (e.g., space suit 301) may be electrically coupled to and driven by an amplifier 305 included in the same component or an amplifier 305 included in a different component (e.g., vehicle, habitat, equipment).

In the example of FIG. 3, the dust mitigation system 300 includes an amplifier 305 and piezoelectric assemblies 310 implemented in association with a space suit 301 and a personal life support system (PLSS) 303 (e.g., implemented as a backpack). In some embodiments, the PLSS 303 may include the amplifier 305, a signal generator 306, a computing device 308, control circuitry 320, relay devices 325, a membrane evaporator 330, and a power source 335.

In some embodiments, the amplifier 305 may be included in a housing of the PLSS 303. Additionally, or alternatively, the amplifier 305 or another amplifier 305 (not illustrated) may be included in a vehicle, a space station, or the like. The amplifier 305 may be detachably couplable directly to the piezoelectric transducers 315 or indirectly to the piezoelectric transducers 315 (e.g., via a connector implemented at the piezoelectric assemblies 310).

The dust mitigation system 300 may include a signal generator 306 operable to provide a waveform output representing a waveform. In some embodiments, the amplifier 305 may be a power amplifier operable to receive the waveform output, amplify the waveform output, and provide an amplified output to one or more piezoelectric transducers 315 of the dust mitigation system 300.

The signal generator 306 may include or be electrically coupled to a computing device 308 configured to control the signal generator 306. In some examples, the computing device 308 may provide commands or control signals for controlling the signal generator 306 in response to processing executable instructions stored on a memory of the computing device 308. The computing device 308 may include suitable electronics or processors configured to communicate with and/or control components of the space suit 301, the PLSS 303, the piezoelectric assemblies 310, and the piezoelectric transducers 315. According to one or more embodiments of the present disclosure, the computing device 308 may include or be integrated with control circuitry 320 for providing commands or control signals described herein.

In some aspects, the computing device 308 may control signal parameters (e.g., current level, voltage level, frequency, signal type, and the like) of the signal generator 306 based on target dust mitigation parameters. For example, the target dust mitigation parameters may correspond to characteristics of regolith dust and associated environmental conditions. Non-limiting examples of the characteristics of regolith dust, based on which the dust mitigation system 300 may implement the dust mitigation and expulsion techniques described herein, include particle size (e.g., diameter), particle type (e.g., lunar outpost dust, or the like), charge level (e.g., positive or negative) associated with the dust, and the like. For example, for a lunar mining operation, the resultant dust may be charged differently (e.g., be of a certain metal, component, more porous, more fine, and the like) at different drilling depths.

In some aspects, the target dust mitigation parameters (also referred to herein as target criteria for removing dust) may include a target temporal duration for removing the dust. In some aspects, the target dust mitigation parameters may be based on a characterization as part of a development phase, in which target levels and behavior for key metrics/variables are determined for conditions equal to or similar to regolith dust at the intended environmental conditions. Non-limiting examples of the target dust mitigation parameters include density, average particle size, and chemical makeup of the particles.

For the example in which the amplifier 305 is included in the PLSS 303, the power source 335 may power the dust mitigation system 300 and, in some cases, other functionality (e.g., life support functions) associated with the PLSS 303 and the space suit 301.

In some embodiments, the amplifier 305 may reside inside of the PLSS 303 and interface/connect to piezo arrays 317 residing within the space suit 301. For example, one or more piezo arrays 317 may be included in a spacesuit water membrane evaporator (SWME), a mini membrane evaporator (supportive of declogging, higher and more effective cooling, desaturation of entrained water, sterilization of remaining solids, and the like), and/or an external layer of the space suit 301. Vibration of piezoelectric transducers 315 included in the piezo arrays 317 may support the expulsion of planetary dust as described herein.

In some embodiments, the dust mitigation system 300 supports achieving target temperatures (e.g., greater than or equal to about 90 degrees Celsius) generated by the vibration of the piezoelectric transducers 315 by varying one or more input parameters of the dust mitigation system 300. For example, aspects of the present disclosure support varying signal parameters (e.g., current level, voltage level, frequency, signal type, and the like) of the signal provided to the piezoelectric transducers 315 and/or varying the material of a piezoelectric assembly 315 (membrane) in association with achieving a target temperature.

In some alternative and/or additional embodiments, the amplifier 305 may reside external to the space suit 301. For example, the amplifier 305 may be included in a space station, habitat, or vehicle, and the amplifier 305 may electrically interface with the piezoelectric assemblies 310 (and associated piezoelectric transducers 315 and piezo arrays 317) via one or more connector interfaces located at the space suit 301. For the example in which the amplifier 305 is exterior to the space suit 301 (e.g., included in a vehicle, a space station, or the like), the power source 335 may power the dust mitigation system 300 and, in some cases, other functionality (e.g., functions of the vehicle, the space station, or the like).

The dust mitigation system 300 may include piezo arrays 317 respective to different parts (e.g., torso, legs, arms, boots, helmet, and the like) of the space suit 301. For example, For example, the piezoelectric assemblies 310 (and respective piezo arrays 317 of piezoelectric transducers 315) may be embedded in fabric removably coupled to (or wearable over) the space suit 301, corresponding to torso, legs, arms, and boots of the space suit 301. In another example, the piezoelectric assemblies 310 (and respective piezo arrays 317 of piezoelectric transducers 315) may be embedded in the fabric of the space suit 301, corresponding to torso, legs, arms, and boots of the space suit 301. In some other examples, the piezoelectric assemblies 310 (and respective piezo arrays 317 of piezoelectric transducers 315) may be coupled to or embedded with the helmet of the space suit 301.

In some examples, the amplifier 305 may electrically interface with the piezo arrays 317 at via a single connector interface common to the piezo arrays 317. Additionally, or alternatively, the amplifier 305 may electrically interface with the piezo arrays 317 via respective connector interfaces of the piezo arrays 317 (or respective connector interfaces of groups of piezo arrays 317). The dust mitigation system 300 may support vibrating all piezoelectric transducers 315 (e.g., at all piezo arrays 317) of the space suit 301 in unison. In some other embodiments, the dust mitigation system 300 may vibrate piezoelectric transducers 315 of different piezo arrays 317 according to a target configuration, a target order, or a target location, example aspects of which are later described herein. In some other embodiments, the dust mitigation system 300 may refrain from vibrating (e.g., by refraining from providing an AC voltage signal, by providing a signal different from the AC voltage signal, or the like) one or more piezoelectric transducers 315 of any piezo arrays 317, based on the target configuration.

Referring to the example of FIG. 3, the dust mitigation system 300 may include surfaces, sleeves, and fabrics that are external to the space suit 301 and embedded with piezo arrays 317 of piezoelectric transducers 315. In some embodiments, the surfaces, sleeves, and fabrics may be attached as covers or sleeves, via a fastening component (e.g., Velcro or other fastener). In an example state in which a surface, sleeve, or fabric embedded with piezoelectric transducers 315 is fastened to the space suit 301, external interfaces of the piezoelectric transducers 315 are in physical contact with external layers of the space suit 301.

According to one or more embodiments of the present disclosure, based on signals provided by the amplifier 305, the piezoelectric transducers 315 may vibrate at a target frequency (e.g., an ultrasonic frequency described herein) supportive of removing foreign objects from an object (e.g., the space suit 301, a fabric cover for space suit 301) to which a piezoelectric assembly 310 (and piezoelectric transducers 315) is coupled or with which the piezoelectric assembly 310 is integrated. In some embodiments, the piezoelectric transducers 315 may be interwoven in the fabric of space suit 301 or a fabric cover wearable over the space suit 301.

In some embodiments, the dust mitigation and expulsion techniques described herein may be implemented as a standalone technique for dust mitigation and expulsion. For example, the dust mitigation and expulsion techniques described herein may support (e.g., through vibration of the piezoelectric transducers 315) removal of dust from the fabric of a cover wearable over the space suit 301, fabric of the space suit 301, a non-fabric surface (e.g., of a helmet) of the space suit 301, or the like. In some embodiments, the dust mitigation and expulsion techniques may be implemented for loosening the dust so as to aid cleaning efficacy.

For example, embodiments of the present disclosure support the described dust mitigation and expulsion techniques (e.g., vibration) in combination one or more other cleaning methods and systems (e.g., vacuuming, brushing, electrostatic or magnetic regolith charged particle removal, dust wiping and brushing, sand like particle filtration, nanocoated layers/surfaces for prevention of dust accumulation, or the like).

In some embodiments, in an example in which piezoelectric transducers 315 are embedded in the fabric of the space suit 301, vibration of the piezoelectric transducers 315 may remove dust from the space suit 301 via micropaths embedded within the fabric of space suit 301. In some embodiments, in an example in which piezoelectric transducers 315 are included in wearable cover or garment (e.g., an external sleeve) wearable over or coupled to the space suit 301, vibration of the piezoelectric transducers 315 may remove dust from the outer surface of the wearable cover or garment.

In some embodiments, the space suit 301 may support converting movement of the user into power for charging the power source 331. For example, with respect to piezoelectricity, the piezoelectric transducers 315 are capable of converting movement of the user (e.g., converting mechanical movement associated with the piezoelectric transducers 315) into electrical signals, and the dust mitigation system 300 may at least partially charge the power source 331 based on the electrical signals.

According to one or more embodiments of the present disclosure, the dust mitigation system 300 may support one or more dust removal configurations. For example, the relay devices 325 (e.g., solid-state relays, electromechanical relays, or the like) may each be assigned to a piezo array 317 corresponding to a target portion of the space suit 301. Non-limiting examples of target portions include the torso, an arm sleeve (e.g., upper arm and/or lower arm), leg sleeves (e.g., upper leg and/or lower leg), boots, and the like.

The computing device 308 (e.g., using control circuitry 320) may cycle through different vibrating surfaces (e.g., torso, arm sleeve, and the like) according to a target order. In some aspects, the target order may support effective dust mitigation and expulsion compared to other candidate orders supported by the dust mitigation system 300. In an example, a target order may include vibrating surfaces associated with an upper portion (e.g., upper arms, upper torso) of the space suit 301, vibrating surfaces associated with a middle portion (e.g., lower arms, lower torso) of the space suit 301, and vibrating surfaces associated with a lower portion (e.g., legs, boots) of the space suit 301.

In some aspects, the target order may be based on one or more dust mitigation and expulsion profiles (also referred to herein as dust mitigation and expulsion configurations) supported by the dust mitigation system 300. In some examples, the dust mitigation system 300 may include a dust mitigation and expulsion profile associated with a relatively highest effectiveness among different dust mitigation and expulsion profiles. In another example, the dust mitigation system 300 may include a dust mitigation and expulsion profile associated with a relatively lowest power consumption (e.g., in exchange for a reduced effectiveness) among different dust mitigation and expulsion profiles.

Each of the dust mitigation and expulsion profiles may be associated with activating target piezoelectric transducers 315 of the dust mitigation system 300. For example, a first dust mitigation and expulsion profile may be associated with activating target piezoelectric transducers 315 of piezo array 317-*d* through piezo array 317-*f* (e.g., for the legs and boots of the space suit 301). In another example, a second dust mitigation and expulsion profile may be associated with activating target piezoelectric transducers 315 of piezo array 317-*a* and piezo array 317-*b* (e.g., for the arms of the space suit 301). In another example, a third dust mitigation and expulsion profile may be associated with activating target piezoelectric transducers 315 of all piezo arrays 317 (e.g., for the entire space suit 301, with or without the helmet based on the configuration).

The dust mitigation system 300 may support providing an AC voltage signal, and correspondingly vibrating piezoelectric transducers 315, in association with removal and sterilization of regolith dust. In an example, in response to a first AC voltage signal of a first magnitude and/or first frequency, piezoelectric transducers 315 driven by the first AC voltage signal may vibrate such that that vibration removes or breaks up dust (e.g., from spacesuit 301) as described herein. Further, for example, in response to a second AC voltage signal of a second magnitude and/or second frequency, piezoelectric transducers 315 driven by the second AC voltage signal may vibrate such that that vibration sterilizes the dust.

Additionally, or alternatively, the computing device 308 and amplifier 305 may provide an AC voltage signal of a given magnitude and frequency to a set of piezoelectric transducers 315, and in response to the AC voltage signal, the set of piezoelectric transducers 315 may vibrate such that that vibration both removes or breaks up dust and sterilizes the dust at the same time.

Accordingly, for example, for a dust mitigation and expulsion profile in which target piezoelectric transducers 315 (rather than all piezoelectric transducers 315) are activated and remaining piezoelectric transducers 315 are inactive (e.g., a dormant state), the dust mitigation system 300 may support effective dust mitigation and expulsion while conserving power. In some embodiments, the control circuitry 320 may be an FPGA based controller supportive of controlling the piezoelectric transducers 315 according to the techniques described herein. In some other embodiments, the dust mitigation system 300 may support user commands for executing, modifying, and creating dust mitigation and expulsion profiles described herein. In some aspects, the dust mitigation and expulsion profiles and associated configurations for activating piezoelectric transducers 315 may be stored in a memory of the computing device 308.

Figure 4:
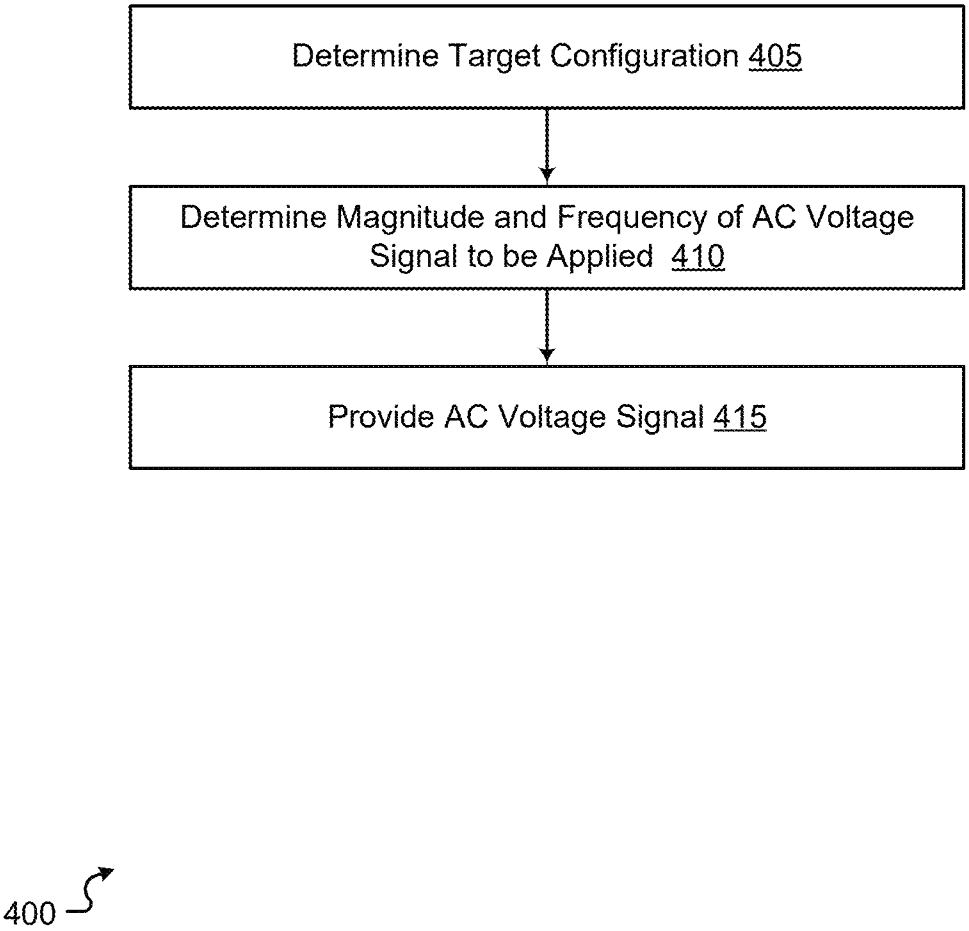
FIG. 4 illustrates an example flowchart of a method in accordance with one or more embodiments of the present disclosure.

FIG. 4 illustrates an example flowchart of a method 400 in accordance with one or more embodiments of the present disclosure. The method 400 may be implemented by the example aspects of a dust mitigation system 300 described herein.

At 405, the method 400 includes determining a target configuration associated with removing regolith dust. At 410, the method 400 includes determining, based on the target configuration, a magnitude and a frequency of an alternating-current (AC) voltage signal to be applied to one or more piezoelectric transducers of a plurality of piezoelectric transducers, wherein the plurality of piezoelectric transducers are included in one or more piezoelectric assemblies removably coupled to a surface of a space suit. At 415, the method 400 includes providing, by amplifier circuitry, the AC voltage signal to the one or more piezoelectric transducers, based on the target configuration, where the one or more piezoelectric transducers vibrate based on the magnitude and the frequency of the AC voltage signal.

In some aspects, providing the AC voltage signal is based on target criteria associated with removing the regolith dust. In some aspects, the target criteria comprises at least one of: a removal level of the regolith dust; a target duration associated with removing the regolith dust; and a target power consumption.

In some aspects, providing the AC voltage signal is based on one or more characteristics associated with the regolith dust. In some aspects, the one or more characteristics comprise at least one of: particle size; particle type; and charge level.

In some aspects, providing the AC voltage signal is based on removing the regolith dust from one or more target locations associated with a protective suit.

In some aspects, providing the AC voltage signal is based on a target sterilization level associated with sterilizing at least a portion of the regolith dust. In some aspects, the vibration of the one or more piezoelectric transducers sterilizes at least the portion of the regolith dust.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the various embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method comprising:

determining a target configuration associated with removing regolith dust;

determining, based on the target configuration, a magnitude and a frequency of an alternating-current (AC) voltage signal to be applied to one or more piezoelectric transducers of a plurality of piezoelectric transducers, wherein the plurality of piezoelectric transducers are comprised in one or more piezoelectric assemblies removably coupled to a surface of a space suit; and receiving a waveform provided by a signal generator, amplifying the waveform, and providing an amplified waveform as the AC voltage signal to the one or more piezoelectric transducers, based on the target configuration, wherein the one or more piezoelectric transducers vibrate based on the magnitude and the frequency of the AC voltage signal, wherein receiving the waveform, amplifying the waveform, and providing the amplified waveform is by amplifier circuitry.

2. The method of claim 1, wherein:

providing the AC voltage signal is based on target criteria associated with removing the regolith dust, wherein the target criteria comprises at least one of:

a removal level of the regolith dust;

a target duration associated with removing the regolith dust; and a target power consumption.

3. The method of claim 1, wherein:

providing the AC voltage signal is based on one or more characteristics associated with the regolith dust, wherein the one or more characteristics comprise at least one of:

particle size;

particle type; and charge level.

4. The method of claim 1, wherein:

providing the AC voltage signal is based on removing the regolith dust from one or more target locations associated with a protective suit;

providing the AC voltage signal is based on a target sterilization level associated with sterilizing at least a portion of the regolith dust; and the vibration of the one or more piezoelectric transducers sterilizes at least the portion of the regolith dust.

5. A space suit comprising:

one or more piezoelectric assemblies removably coupled to a surface of the space suit, wherein the one or more piezoelectric assemblies comprise a plurality of piezoelectric transducers; and a personal life support system, wherein:

one or more piezoelectric transducers of the plurality of piezoelectric transducers are configured to vibrate based on a magnitude and a frequency of an alternating-current (AC) voltage signal provided by amplifier circuitry, wherein the amplifier circuitry is coupled to the plurality of piezoelectric transducers and is comprised in the personal life support system or external to the space suit, and the amplifier circuitry is configured to receive a waveform provided by a signal generator, amplify the waveform, and provide the amplified waveform as the AC voltage signal; and the magnitude and the frequency of the AC voltage signal are based on a target configuration associated with removing regolith dust.

6. The space suit of claim 5, wherein:

the one or more piezoelectric assemblies are included in a fabric of a protective suit, and the target configuration is associated with removing the regolith dust from the surface of the protective suit; or the one or more piezoelectric assemblies are included in a garment wearable over the protective suit, and the target configuration is associated with removing the regolith dust from a surface of the garment.

7. A system comprising:

one or more piezoelectric assemblies, wherein the one or more piezoelectric assemblies comprise a plurality of piezoelectric transducers; and amplifier circuitry coupled to the plurality of piezoelectric transducers and configured to receive a waveform provided by a signal generator, amplify the waveform, and provide an amplified waveform as an alternating-current (AC) voltage signal to one or more piezoelectric transducers of the plurality of piezoelectric transducers, based on a target configuration associated with removing regolith dust, wherein the one or more piezoelectric transducers are configured to vibrate based on a magnitude and a frequency of the AC voltage signal.

8. The system of claim 7, wherein the one or more piezoelectric assemblies are removably coupled to an exterior surface of a protective suit.

9. The system of claim 7, wherein the one or more piezoelectric assemblies are included in a fabric of a protective suit, and the target configuration is associated with removing the regolith dust from a surface of the protective suit.

10. The system of claim 7, wherein the one or more piezoelectric assemblies are included in a garment wearable over a protective suit, and the target configuration is associated with removing the regolith dust from a surface of the garment.

11. The system of claim 7, further comprising:

a personal life support system removably electrically couplable to a protective suit, wherein the amplifier circuitry is comprised in a housing of the personal life support system, wherein the protective suit comprises a space suit operable in a space environment.

12. The system of claim 7, further comprising:

a vehicle, a space station, or habitat operable in a space environment, wherein the amplifier circuitry is comprised in at least one of the vehicle, the space station, or the habitat.

13. The system of claim 7, wherein the amplifier circuitry is configured to refrain from providing the AC voltage signal to one or more second piezoelectric transducers of the plurality of piezoelectric transducers, based on the target configuration.

14. The system of claim 7, wherein:

the amplifier circuitry is configured to provide a second AC voltage signal to one or more second piezoelectric transducers of the plurality of piezoelectric transducers, based on the target configuration, wherein the one or more second piezoelectric transducers are configured to vibrate based on a second magnitude and a second frequency of the AC voltage signal; and providing the AC voltage signal and the second AC voltage signal is based on the target configuration associated with removing the regolith dust, wherein the target configuration comprises an order associated with activating the one or more piezoelectric transducers and the one or more second piezoelectric transducers.

15. The system of claim 7, wherein:

providing the AC voltage signal is based on target criteria associated with removing the regolith dust, wherein the target criteria comprises at least one of:

a removal level of the regolith dust;

a target duration associated with removing the regolith dust; and a target power consumption.

16. The system of claim 7, wherein:

providing the AC voltage signal is based on one or more characteristics associated with the regolith dust, wherein the one or more characteristics comprise at least one of:

particle size;

particle type; and charge level.

17. The system of claim 7, wherein:

providing the AC voltage signal is based on removing the regolith dust from one or more target locations associated with a protective suit, wherein the one or more target locations are associated with at least one of:

a torso area of the protective suit;

an arm sleeve of the protective suit;

a leg sleeve of the protective suit;

a boot associated with the protective suit; and a helmet associated with the protective suit.

18. The system of claim 7, wherein:

providing the AC voltage signal is based on a target sterilization level associated with sterilizing at least a portion of the regolith dust; and the vibration of the one or more piezoelectric transducers sterilizes at least the portion of the regolith dust.

19. The system of claim 7, wherein at least one piezoelectric assembly of the one or more piezoelectric assemblies is of:

a cuff shape;

a sleeve shape;

a mesh structure; and a plate assembly.

20. The system of claim 7, wherein the one or more piezoelectric assemblies are formed of at least one of:

a fabric material; and a flexible material.

* * * * *